(12) United States Patent
Gartner

(10) Patent No.: US 6,293,384 B1
(45) Date of Patent: Sep. 25, 2001

(54) TRANSPORTING ROLLER FOR CONVEYING PATHS IN SYSTEMS FOR TRANSPORTING OBJECTS

(76) Inventor: Franz Gartner, Muhlweg 10, 97656 Oberelsbach (DE)

(*) Notice: Subject to any disclaimer, the term of this patent is extended or adjusted under 35 U.S.C. 154(b) by 0 days.

(21) Appl. No.: 09/470,627

(22) Filed: Dec. 22, 1999

(30) Foreign Application Priority Data

Dec. 22, 1998 (DE) ............................................. 198 59 457

(51) Int. Cl.⁷ ................................................. B65G 13/00
(52) U.S. Cl. ............................................................ 193/37
(58) Field of Search ............................. 198/678.1, 465.4; 193/37 R; 492/16

(56) References Cited

U.S. PATENT DOCUMENTS 2,648,577 * 8/1953 Watt .................................... 193/37 X
5,050,718 * 9/1991 Orlosky .............................. 193/37 X

* cited by examiner

Primary Examiner—James R. Bidwell
(74) Attorney, Agent, or Firm—Harness, Dickey & Pierce, P.L.C.

(57) ABSTRACT

A transporting roller is provided. The transporting roller includes two parallel spaced apart side flanges and a central part positioned between the flanges. The flanges and the central part have corresponding pass-through openings. The central part also includes at least one annular circumferential part rotatable with respect to the flanges when the circumferential part contacts a conveying path.

29 Claims, 3 Drawing Sheets

Figure 1:
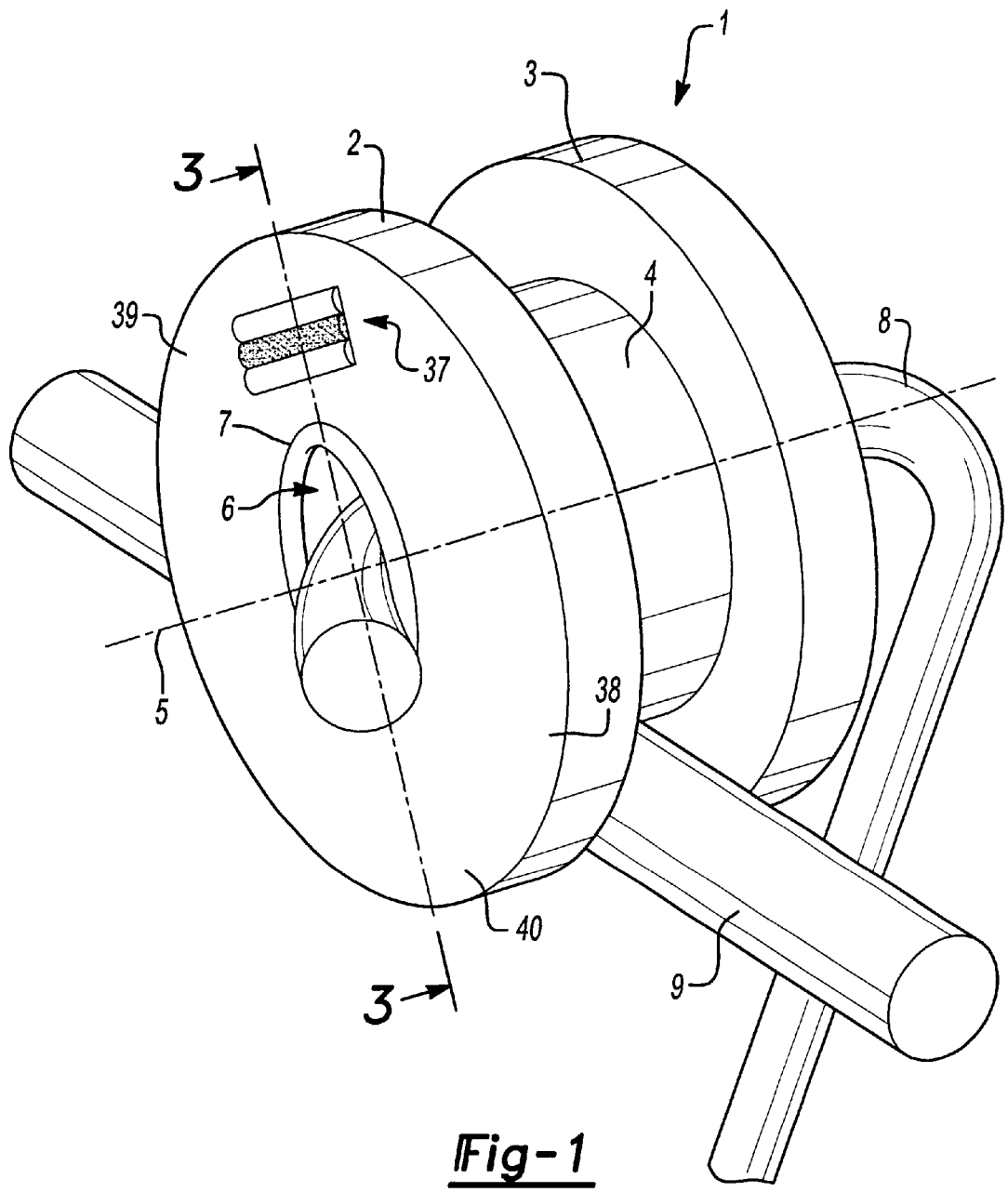

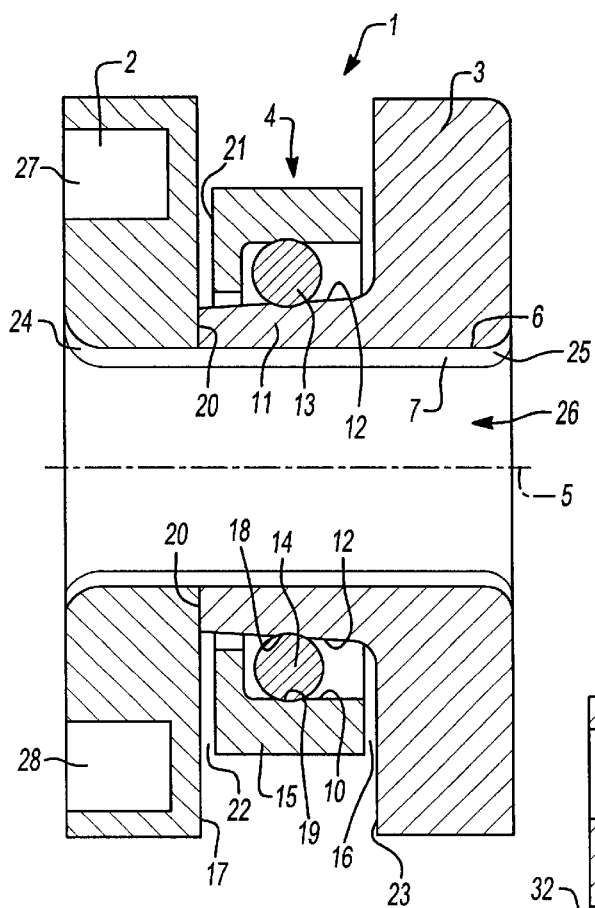
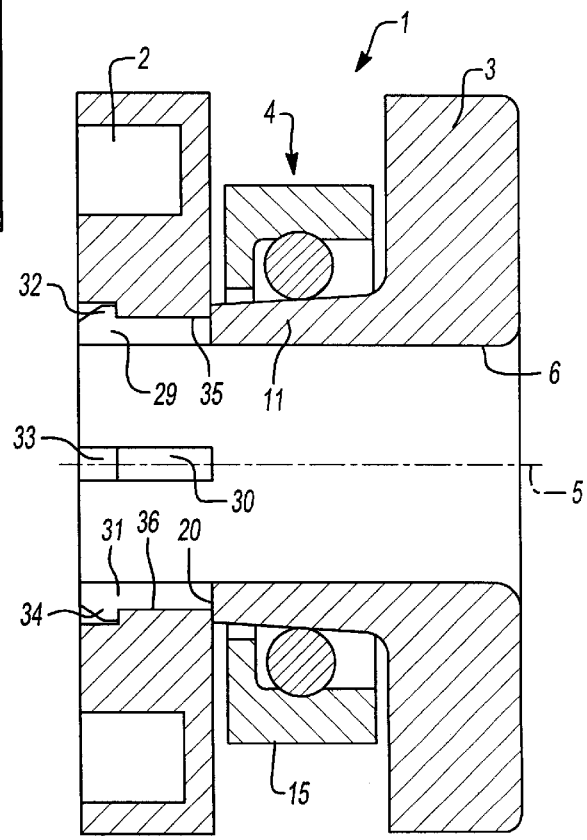

TRANSPORTING ROLLER FOR CONVEYING PATHS IN SYSTEMS FOR TRANSPORTING OBJECTS

The invention relates to a transporting roller for conveying paths in systems for transporting objects, in particular items of clothing, containing two parallel spaced-apart, end-side flanges and a central part, located therebetween, and a through-passage opening which passes through centrally between the flanges and the central part.

Such a transporting roller is described in EPA 0 220 380 A2 and essentially comprises a single-piece roller part and a coding part. The precondition for use is that both the roller part and the coding part are fixedly assigned to the carrier element, the entire roller part rolling on the conveying path. While, during operation, the coding part is always in the same position in relation to the associated carrier element, and thus has identically positioned coding information for at least one read device provided in the conveying system, the single-piece roller part, which comprises the two parallel flanges and the central part, which firmly connects the two flanges, moves on at least one conveying path, as may be assigned to clothing, in particular, in production workshops and in distribution systems in warehouses and larger department stores.

The flange which has its end side directed toward the carrier element, which is bent in relation of the item of clothing, constitutes a solid disk, whereas the flange which has its end side directed away from the carrier element has an end-side, cylindrical recess into which the disk-like coding part can be fitted, the coding part, by way of its adapted-diameter sleeve part which is attached to it and passes through the central through-passage opening of the roller part, being firmly secured on the carrier element on the other side, in front of the solid-disk flange, by a split pin. In this case, high outlay in terms of precise mechanical machining is necessary for the design and assignment of the transporting roller. On the other hand, the braking behavior in the region between the inner surface of the through-passage opening and the outer surface of the sleeve part, and in the contact region between the split pin and the end side of the solid-disk flange, is of such a magnitude that, in some circumstances, there is undesired friction during the conveying operation. Moreover, the internal lubrication between the friction-producing surfaces poses a large problem as far as sealing is concerned.

The central part comprises smaller-diameter side elements, which are each attached to the flanges, and an intermediate element which connects the side elements to one another, the side elements each having a sloping surface which is inclined in relation to the center axis. The transporting roller rests on the conveying path, by way of the sloping surfaces, with the carrier element hanging downward. The two end-sides rotating disk flanges may additionally serve as side guides when the transporting rollers move on the conveying path.

On the conveying paths, there is usually a large number of transporting rollers, which are each assigned a carrier element in a defined manner and thus also the item of clothing which is to be transported to the code-defined working stations or sales areas.

A further transporting roller is known from EPA 0 203 290 A2. In this document, the transporting roller is in a single piece and likewise comprises two end-side flanges and a central part which is located therebetween and comprises an intermediate element and two smaller-diameter side elements which are each assigned to the flanges and are attached there. The center axis is assigned a coaxial opening or a through-passage opening it which the carrier element is fitted. Provided on the disk flange which is directed away from the hanging carrier element are coding devices which rotate with the flange and comprise, for example, counting coding elements. When the coding elements move past the associated read devices, the information can be read.

There is a problem in that, here too, the carrier elements or hooks are fixedly assigned to the coding on the coding flange in a coding-related manner in order that there are no misroutings on the conveying paths.

Another known transporting roller is described in German Laid-open Application 1 781 310, in which, as with the first-mentioned, known transporting roller, both a single-piece roller part and a non-rotating coding part, which is adapted into and/or onto the flange, are provided. The coding part is fixedly connected to the carrier element and has a keyboard which preferably projects beyond the flange end side, can be actuated manually and by means of which the coding can be changed, depending on the location of the transporting roller in the conveying system. The central part is firmly connected to the smaller-diameter side elements and the flanges. Here too, the transporting roller rolls on the conveying path by way of its side elements without coming into contact with the intermediate element. The two side-element-mounted disk flanges constitute additional side guides.

A problem with all the known transporting rollers is that, for example, in the case of jamming between two or more transporting rollers, respectively associated flanges come into contact following the impact. Since, in the contact region, the transporting rollers execute oppositely directed rotational movements as they start to roll again, this produces friction which accumulates depending on the number of the rollers jammed, it being possible, in unfavorable circumstances, for transporting rollers to lift one another off the conveying path. The mutual lifting-off/lifting-out operation, also referred to as the climbing effect, may result in at least one of the transporting rollers tipping off the conveying path or possibly in one transporting roller jamming over the adjacent one, which may develop into extensive disruption throughout the transporting sequence of the conveying system.

Also common to all the known transporting rollers is the fact that the carrier elements have designs made specifically for the respective transporting roller. The adaptations mean that first of all the production of the individual parts and secondly also the installation thereof are associated with high outlay.

The object of the invention is thus to specify a transporting roller for conveying paths which is designed suitably such that, in the case of jamming of at least two transporting rollers, the climbing effect is avoided and it is ensured that the transporting roller is compatible for use in all conveying systems.

The object is achieved by the features of claim 1. In the transporting roller, according to the preamble of claim 1, the central part has at least one peripheral, annular circumferential part which can rotate separately from the two flanges, the two flanges being connected to one another, and to the circumferential part, such that, when the circumferential part is being rotated as a result of resting on the conveying path, the two flanges are located in a rest state irrespective of the rotation.

The central part has at least one annular web which is directed toward the other flange, is extended on one side and belongs to at least one of the two flanges with a uniform diameter with respect to the through-passage opening, the annular circumfrential part enclosing the annular web with the support of roller-contact bearings.

The end-side flanges are designed such that, in terms of dimensions, they project belong the annular circumferential part by in each case at least one impact-specific subregion and at least one conveying-path-specific subregion.

The flanges are preferably disk-like, and project beyond the circumferential part all the way round.

There may optionally be located in through-passage opening a cylindrical securing part which holds the two flanges and the central part together.

The securing part, which is located in the through-passage opening, is preferably a cylindrical bushing which has a minimum length corresponding approximately to the length of the through-passage opening and of which the free end regions are each bent laterally for the securing riveting of the flanges and of the central part.

From its attachment to one of the two flanges in each case as far as its free end region, which is flattened perpendicularly to the center axis, the annular web may have its outer surface inclined in the direction of the center axis.

The outer surface of the annular web simultaneously constitutes the inner running surface for the rolling-contact elements of a rolling-contact bearing.

Directed approximately centrally between the inner surfaces of the flanges and perpendicularly to the center axis, the inner running surface preferably has an encircling groove-like depression which is adapted with correct dimensions to the surfaces of the rolling-contact elements and in which the rolling-contact elements can move.

The annular rotatable circumferential part encloses the rolling-contact elements on the outside in the form of an outer ring.

Spaced apart radially from the inner running surface, the outer ring encloses the rolling-contact elements by way of a disk-like side wall which is angled on one side, the side wall, for installation reasons, being located on the side which is directed toward the second flange.

On its paraxial inner surface, the outer ring has, in the same way as the annular web, an encircling groove-like depression which is directed perpendicularly to the center axis and is likewise adapted with correct dimensions to the surfaces of the rollingcontact elements.

For installation reasons in particular, the outer ring may be designed to be open in the direction of the side of the larger annular-web diameter or of the first flange.

In each case a small amount of slit-induced play for improving the running properties is present between the outer ring and the inner surfaces of the first and of the second flanges.

The second disk-like flange is secured firmly against the free flattened end region of the annular web by the securing part, the hollow-cylindrical securing part pressing the second flange onto the flattened end region by the firm riveting. A hook of a clothes hanger can be fitted into the securing part, which has a channel.

It is also possible for the two flanges to be held together by the latching, of corresponding latching elements provided in the two flanges.

In this case, the annular web may be extended by a plurality of paraxially directed insertion arms which are integrally attached to it, constitute latching elements and at the free end of which in each case radially directed latching noses are formed, continuous latching recesses which are adapted to the dimensions of the insertion arms and are stepped in the radially outward direction being provided in the second flange such that, when the second flange is installed at the free end region of the annular web, the latching noses each latch into the associated stepped latching recesses and secure the second flange on the end region of the first flange.

Furthermore, the fixed connection between the two flanges may otherwise be achieved by screw-connection by means of an externally threaded annular web and an internally threaded second flange.

In the region of the running surfaces of the rolling-contact elements or balls, air cooling may be provided between the groove-like depressions and passes through the open rolling-contact bearing (ball bearing).

Plastic may be used for the flanges and metallic material may be used for the rotatable circumferential part. The rolling-contact elements may preferably be designed as metal balls.

The groove-like depressions of the annular web and/or of the outer ring may be, provided, in particular sprayed, with at least one material which improves, the running properties.

In order to improve the assignment in the conveying systems, at least one of the flanges may contain at least one coding device which may be fastened in and/or on the flange.

In this case, the flanges may have hole-like recesses in which the coding devices are fastened.

The recesses on at least one of the flanges may also constitute an annular groove in and/or on which the coding devices are fastened.

The coding devices may be radially directed and/or inductive magnetic and/or capacitive devices, and/or pins, which are arranged in the form of a circle and are made of a material which differs from the flange material, or may also be bar codes.

Furthermore, it is also possible for the coding devices to be designed as electrical components with connected ROM and/or RAM modules.

Depending on requirements, the coding devices may be provided on the two flanges either such that they are of symmetrical construction and design and/or such that they supplement one another in signaling terms.

The conveying path may be designed as an endless round-steel or plastic-element linked structure or tubular-element linked structure or as an endless round-belt arrangement.

The carrier element is preferably a conventional bent hook of a coat hanger or of a hanging means for items of clothing.

THE INVENTION WILL BE EXPLAINED IN MORE DETAIL

WITH REFERENCE TO AN EXEMPLARY

EMBODIMENT BY MEANS OF A NUMBER OF

Figure 2:
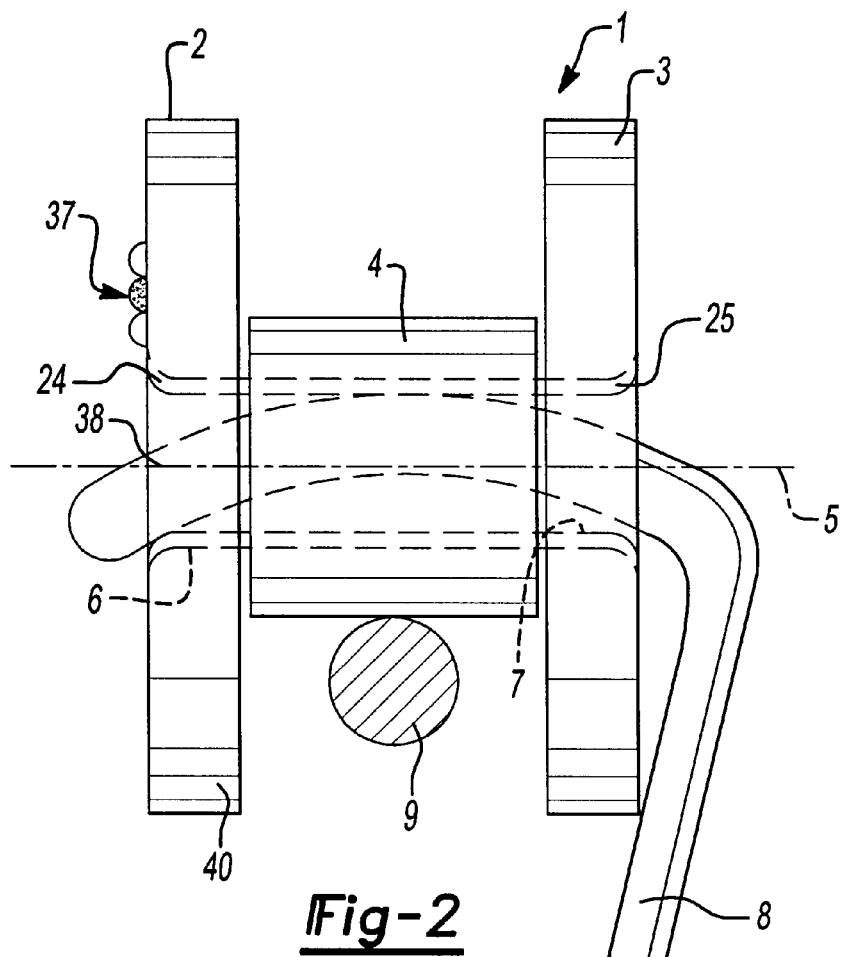

DRAWINGS, IN WHICH:

FIG. 1 shows a schematic perspective illustration of the transporting roller according to the invention on a conveying path with the exchangeable carrier element hooked in, FIG. 2 shows a front view of the transporting roller according to the invention transverse to the conveying path, FIG. 3 shows a cross section through the transporting roller along line I—I according to FIG. 1 without carrier element, conveying path and bar coding, but with recesses and with a securing part, and FIG. 4 shows a cross section according to FIG. 3 using corresponding latching elements instead of a rivetable securing part for holding the two flanges together.

The same parts with the same function have the same designations throughout FIGS. 1 to 4.

In FIGS. 1 and 2, the transporting roller 1 according to the invention essentially comprises two parallel, respectively end-disk-like outer flanges 2, 3 and a central part 4, which is located therebetween. Provided along the associated center axis 5 is a through-passage opening 6 in which a securing part 7 is optionally located. The transporting roller 1 is connected to an arcuate carrier element 8 via its through-passage opening 6. For this purpose, the central part 4 rests on a conveying path 9, movement of the transporting roller 1 being possible when said conveying path is inclined.

The conveying paths 9 may be designed as endless round-steel or plastic-element linked structures or tubular-element linked structures or as endless round belts.

In FIG. 2, the carrier element 8 is a conventional bent hook of a clothes hanger or hanging means for items of clothing. The hook 8 rests in each case on the ends of the securing part 7. The securing part 7 is a hollow-cylindrical bushing, of which the end regions are each bent outward by respective riveting 24, 25.

The inner construction of the transporting roller 1 according to the invention cannot re readily seen from FIGS. 1 and 2. The transporting roller 1 according to the invention is therefore shown in section in FIG. 3. The central part 4, which is located between the first flange 3 and the second flange 2, has an annular web 11 which is directed toward the second flange 2, is extended on one side and belongs to the first disk-like flange 3 with a central bore as throughpassage opening 6 or uniform diameter. From its attachment to the first flange 3 as far as its free end region 20, which is flattened perpendicularly to the center axis 4, the annular web 11 has its outer surface inclined slightly. The slightly inclined outer surface of the annular web 11 simultaneously constitutes the inner running surface 12 for the rolling-contact, elements 13, 14 of a rolling-contact bearing. A multiplicity of rolling-contact elements are usually necessary for a functionally reliable rolling-contact bearing. Centrally, the inner running surface 12 has an encircling groove-like depression 18 which is adapted with correct dimensions to the outer surfaces of the rolling-contact elements 13, 14 and in which the rolling-contact elements 13, 24 can move. On the outside, spaced apart radially from the inner running surface 12, the rotatable circumferential part 15 encloses the rolling-contacts elements 13, 14 in the form of an outer ring and has a disk-like side wall 21 which is angled perpendicularly to the center axis 5 and is located on that side of the annular web 11 which is provided with the smaller diameter. For installation reasons inter alias, the outer ring 15 is preferably open in the direction of the side of the larger annular-web diameter or of the first flange 3. The outer ring 15 is provided with a small amount of slit-induced play 16, 17 in each case in relation to the inner surfaces 23, 22 of the first and of the second flanges 3, 2. On its paraxial inner running surface 10, the outer ring 15 may likewise contain an encircling groove-like depression 19 which is likewise adapted to the surfaces of the rolling-contact elements 13, 14.

The second disk-like flange 2 is secured firmly against the free flattened end region 20 of the annular web 11 by the securing part 7, the securing part 7 pressing the second flange 2 against the end region 20 of the annular web 11 by firm riveting 24, 25. Provided through the hollow-cylindrical securing part 7 is a channel 26 into which the hook 8 of a clothes hanger is introduced and pushed through until that position of the hook 8 which is shown in FIG. 2 is reached.

In the simplest case (FIGS. 1 and 2), the second flange 2 may be provided with bar coding 37.

In FIG. 3, the second disk-like flange 2 has hole-like recesses 27, 28 in which, instead of the bar coking 37 shown in FIGS. 1 and 2, it is possible to fasten coding devices having electrical and electronic components (not depicted). The coding devices may be, for example, radially directed inductive, magnetic and/or capacitive devices, or pins, which are arranged in the form of a circle and are made of a material which differs from the flange material, in order for it to be possible to remove stored information therefrom. However, the recesses 27, 26 may also constitute an groove in which it is possible to secure electrical components coupled to ROM and/or RAM modules.

In FIG. 4, the annular web 11 is extended, by coaxially guided, elastic insertion arms 29, 30, 31 (representative of others) which constitute latching elements and at the end of which in each case radially outwardly directed latching noses 32, 33, 34 are formed. Continuous latching recesses 35, 36 which are adapted to the dimensions of the insertion arms 29, 30, 31 and are stepped in the outward direction are then provided in the second flange 2. When the second flange 2 is installed at the free end region 20 of the annular web 11, for example the latching noses 32, 34 latch, by counterpressure in each case into the associated stepped latching recesses 35, 36 and secure the second flange 2 in, abutment against the end region 20.

In addition to riveting by means of the sleeve-like or bushing-like, hollow-cylindrical securing part 7, the two flanges 2, 3 may thus also be held together by latching via the corresponding latching elements, e.g. 29, 32, 35 and 31, 34, 36 in the two flanges 2, 3. It is also possible to provide other ways for fixedly connecting the two flanges 2, 3, e.g. by screw-connection between an externally threaded annular web 11 and an internally threaded second flange 2.

The invention makes it possible in that the rotating central part 4—in particular the circumferential part 25 supported by rolling-contact bearings or ball bearings—has the outer flanges 2, 3, in particular the impact-specific subregions 38, 39 shown in FIGS. 1, 2 and the conveying-path-specific subregions 40, projecting beyond it, the outer flanges 2, 3, rather than rotating during the conveying operation, moving in the conveying direction in unchanging positions or in the rest state relative to one another. This means, that, when two adjacent transporting rollers strike against one another, the climbing effect can be avoided since it is in each case the stationary subregions 38, 39 of the two opposite transporting rollers which come into contact with one another. Since the flanges 2, 3 no longer originally constitute a roller part in the sense of known transporting rollers, it is possible, in appropriate cases, for the conveying systems to dispense with a definite roller form of the flanges 2, 3 and to select a form which is more appropriate for the conveying system and requires lower costs and material outlay. By virtue of resulting partial changing function from rolling part to resting part of the flanges, it is also possible for the center of gravity of the transporting roller to be displaced vertically downward from the center axis 5, with the result that additional savings in material are possible in particular at the top, unnecessary regions of the flanges 2, 3. The roller form does require the in each case projecting regions or, subregions 38, 39 in the possible impact region in relation to the transporting rollers which are upstream and/or downstream on the conveying path 9 and in the bottom side-guide subregion 40 of the conveying paths 9, which bear the central part 4.

In the region of the running surfaces, conventional transporting rollers usually require specifically adapted lubrication by means of special greases or oils, which usually require particular high-outlay measures for sealing purposes. In the case of the transporting roller 1 according to the invention, in contrast, the low level of contact of the rolling-contact elements or balls 13, 14 in the region of their running surfaces 10, 12 means that air cooling is sufficient.

Its non-rotating flanges 2, 3 mean that the transporting roller 1 according to the invention is suitable for fixed-program or programmable coding devices, for example bar codes or chips or other electrical or electronic components or in combination with ROM or RAM, to be provided in said flanges, since said components do not rotate either and thus reliably make it possible for coding information, for example, to be read and detected as a transporting roller I according to the invention moves past a read station. If required, i.e. if write stations are also provided in the conveying system in addition to read stations, the flange, containing at least one coding device, may also contain programmable devices in which the information in the RAM chip of the associated flange may be changed during movement past a read/write station.

Since, in the case of the transporting roller 1 according to the invention, the two associated flanges 2, 3 are in an unchanging, rest position, depending on requirements, either the coding devices may be provided symmetrically on the two flanges 2, 3 or the coding devices on and/or in the flanges 2, 3 may supplement one another in signaling terms such that the dimensions, in particular the flange sizes, of the transporting roller can be reduced to a minimum.

Plastic may be used for the flanges 2, 3 and preferably metallic material may be used for the rotatable circumferential part 15. The rolling-contact elements 13, 14 may be designed, in particular, as metal balls. In order to improve the running properties of the rolling-contact elements 13, 14 in the groove-like depressions 18, 19 of the annular web 11 or of the outer ring 15, these may be provided, in particular sprayed, with materials which improve the running properties.

The invention makes it possible for the transporting roller 1 to be assigned, at the beginning of the transporting operation in each case, to a hook 8 or clothes hanger which can be disengaged or removed again from the transporting roller 1 following a conveying operation. This is advantageous because, for transporting items of clothing, the transporting roller 1 according to the invention does not require any special hooks or clothes hangers; rather, it is possible to use conventional clothes hangers with the known wire hooks as the carrier element 8, with the result that the carrier elements 8 can be exchanged as required.

The central part 4, which is supported by rolling-contact bearings or ball bearings and can roll on the conveying path 9, causes the loading in the inner running surfaces 10, 12 to be reduced such that it is possible to achieve a longer service life in relation to the conventional transporting rollers, which have considerably larger running surfaces.

I claim:

1. A transporting roller for transporting objects on a conveying path, said transporting roller comprising two parallel spaced-apart, end-side flanges having a first through-passage opening and a central part located between said flanges, said central part having a second through-passage opening corresponding to said first through-passage opening and including at least one peripheral, annular circumferential part rotatable with respect to said flanges, said flanges being connected to one another and to said circumferential part, whereby said circumferential part rotates with respect to said flanges when said circumferential part contacts the conveying path and wherein said flanges are disk shaped extending beyond said circumferential part and being positioned parallel to the conveying path.

2. The transporting roller as claimed in claim 1, wherein the central part includes at least one annular web extending from at least one of said flanges, said at least one annular web having a uniform diameter with respect to said through-passage opening, said circumferential part being positioned substantially about said at least one annular web and including at least one rolling-contact element being positioned substantially between said circumferential part and said at least one annular web.

3. The transporting roller as claimed in claim 1, wherein the circumferential part includes at least one impact subregion and said flanges include at least one conveying path subregion extending beyond said at least one impact subregion.

4. The transporting roller as claimed in claim 1, wherein the conveying path is selected from a group consisting of an endless round-steel structure, a plastic element linked structure, a tubular-element linked structure, and an endless round-belt arrangement.

5. The transporting roller as claimed in claim 1, wherein said flanges and said central part are connected by a cylindrical securing part located in said through-passage opening.

6. The transporting roller as claimed in claim 5, wherein said securing part is a cylindrical bushing having a plurality of laterally bent end regions securing said flanges and said central part.

7. The transporting roller as claimed in claim 2, wherein said through-passage opening has a center axis and said annular web includes an end region positioned perpendicular relative to said center axis and an outer surface inclined relative to said center axis.

8. The transporting roller as claimed in claim 7, wherein said inclined outer surface of said annular web forms an inner running surface for said at least one rolling-contact element.

9. The transporting roller as claimed in claim 8, wherein said inner running surface includes a depression operable to receive said at least one rolling-contact element.

10. The transporting roller as claimed in claim 9, wherein said circumferential part is positioned substantially about said at least one rolling-contact element.

11. The transporting roller as claimed in claim 10, wherein said circumferential part includes a disk shaped side wall spaced apart from said inner running surface, said disk shaped side wall operable to secure said at least one the rolling-contact element.

12. The transporting roller as claimed in claim 2, wherein said circumferential part includes an inner surface having a depression operable to receive said at least one rolling-contact element.

13. The transporting roller as claimed in claim 1, wherein a gap exists between said circumferential part and one of said flanges.

14. The transporting roller as claimed in claim 1, wherein a gap is present between said circumferential part and each of said two flanges.

15. The transporting roller as claimed in claim 5, wherein said securing part includes a channel operable to receive a carrier element, said securing part retaining one of said flanges against an end region of said annular web.

16. The transporting roller as claimed in claim 1, wherein said two flanges are secured by at least one set of corresponding latching elements positioned in at least one of said two flanges.

17. The transporting roller as claimed in claim 2, wherein a plurality of paraxially directed insertion arms are attached to said annular web, said plurality of paraxially directed insertion arms forming a plurality of latching elements having radially extending latching noses, and one of said flanges being provided with a plurality of continuous latching recesses, said latching noses being engageable with said latching recesses, whereby said one of said flanges is securable to an end region of said annular web.

18. The transporting roller as claimed in claim 2, wherein a portion of said annular web is externally threaded and one of said two flanges is internally threaded such that said portion of said externally threaded annular web is securable to said internally threaded flange.

19. The transporting roller as claimed in claim 12, wherein air cooling is provided between said depression of said inner surface and said at least one rolling-contact surface.

20. The transporting roller as claimed in claim 2, wherein said flanges are made from a plastic material, said circumferential part is made from a metallic material, and said at least one rolling-contact element made from a metal material.

21. The transporting roller as claimed in claim 9, wherein one of said depression of said annular web and said circumferential part is provided with at least one material which improves the running properties.

22. The transporting roller as claimed in claim 1, wherein at least one of said two flanges includes at least one coding device fastened to said at least one of said two flanges.

23. The transporting roller as claimed in claim 22, wherein said at least one of said two flanges includes at least one recess operable to receive said at least one coding device.

24. The transporting roller as claimed in claim 23, wherein an annular groove forms said at least one recess, said at least one coding device being fastened in said annular groove.

25. The transporting roller as claimed in claim 22, wherein said at least one coding device is arranged in the form of a circle and made of a material differing from said flange material and selected from a group consisting of radially directed devices, inductive devices, magnetic devices, capacitive devices, and pins.

26. The transporting roller as claimed in claim 22, wherein said at least one coding device is an electronic component connected to one of a RON module and a RAM module.

27. The transporting roller as claimed in claim 22, wherein said at least one coding device is provided on both of said two flanges.

28. The transporting roller as claimed in claim 15, wherein said carrier element is selected from a group consisting of a hook of a clothes hanger and a hanging means for items of clothing.

29. A transporting roller for transporting objects along a conveying path, said transporting roller comprising;

first and second flanges, each said flange having a first passage therethrough;

a central portion that is rotatable relative to said first and second flanges about a central axis, said central portion having a second passage therethrough, said central portion being positioned between said first and said second flanges such that said second passage is aligned with said first passage, said central portion having at least one annular surface spaced at a first distance from said central axis; and each said flange extending radially outwardly a second distance from said central axis, said second distance being greater than said first distance.

* * * * *